(12) United States Patent
Heyns

(10) Patent No.: US 9,668,426 B2
(45) Date of Patent: Jun. 6, 2017

(54) SQUARE BALER

(71) Applicant: CNH Industrial America LLC, New Holland, PA (US)

(72) Inventor: Jolan Heyns, Oostkamp (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/404,190

(22) PCT Filed: May 28, 2013

(86) PCT No.: PCT/EP2013/060967
§ 371 (c)(1),
(2) Date: Nov. 26, 2014

(87) PCT Pub. No.: WO2013/178632
PCT Pub. Date: Dec. 5, 2013

(65) Prior Publication Data
US 2015/0135676 A1    May 21, 2015

(30) Foreign Application Priority Data

May 31, 2012  (BE) .................................. 2012/0365

(51) Int. Cl.
*A01F 15/08* (2006.01)
*B30B 7/04* (2006.01)
*B30B 9/30* (2006.01)

(52) U.S. Cl.
CPC ...... *A01F 15/0825* (2013.01); *A01F 15/0841* (2013.01); *B30B 7/04* (2013.01); *B30B 9/3025* (2013.01)

(58) Field of Classification Search
CPC ............. A01F 15/0825; A01F 15/0841; B30B 9/3025; B30B 9/3007; B30B 9/3089; B30B 7/04
USPC ........................................ 100/179, 191, 192
See application file for complete search history.

(56) References Cited

U.S. PATENT DOCUMENTS

| | | | | |
|---|---|---|---|---|
| 3,212,432 A * | 10/1965 | Raab | ..................... | B30B 9/3089 100/192 |
| 3,212,434 A * | 10/1965 | Raab | ..................... | B30B 9/3025 100/192 |
| 4,037,528 A * | 7/1977 | White | ................... | B30B 9/3025 100/191 |
| 5,009,062 A | 4/1991 | Urich et al. | | |
| 5,735,199 A * | 4/1998 | Esau | ................... | A01F 15/0825 100/191 |
| 5,819,643 A | 10/1998 | McIlwain et al. | | |
| 8,539,878 B2 | 9/2013 | Verhaeghe et al. | | |
| 2003/0029148 A1* | 2/2003 | Chont | ................... | A01F 15/042 56/8 |

FOREIGN PATENT DOCUMENTS

| | | |
|---|---|---|
| GB | 813393 A | 5/1959 |
| GB | 846396 A | 8/1960 |

* cited by examiner

*Primary Examiner* — Jimmy T Nguyen
(74) *Attorney, Agent, or Firm* — Patrick M. Sheldrake

(57) ABSTRACT

A square baler having a baling chamber of which the side walls are movable by respective hydraulic cylinders. The supply of hydraulic fluid to and from the two hydraulic cylinders is effected by a common control circuit that ensures that the two sides walls are displaced in synchronism with one another by equal and opposite amounts.

7 Claims, 3 Drawing Sheets

SQUARE BALER

This application is the US National Stage filing of International Application Serial No. PCT/EP2013/060967 filed on May 28, 2013 which claims priority to Belgian Application BE2012/0365 filed May 31, 2012, each of which is incorporated herein by reference in its entirety.

FIELD OF THE INVENTION

The present invention relates to a square baler.

BACKGROUND OF THE INVENTION

A square baler is an agricultural machine that picks up crop from a field and forms it into square bales. The crop picked up from the field is fed by way of an intake chute into a baling chamber having rectangular sides. The chamber is open at its discharge end and has a reciprocating plunger at its end next to the intake chute. In operation, after a desired quantity of crop has been amassed in the intake chute, it is advanced from below into the baling chamber. The plunger is then reciprocated to compress the crop against the previously completed bale that has yet to be discharged to form a compressed slice. The process is then repeated to allow the bale to grow slice by slice, and when it reaches a desired size, it is tied with twine. Each completed bales pushes the previously completed bale out of the baling chamber but remains in the baling chamber to help in forming the next bale.

As square balers are well known in themselves and well documented in the art, it is believed that the person skilled in art will be familiar with their construction and operation and will not require further explanation.

In order to enable the baling density to be regulated, it is known for the side walls of the baling chamber to be movable relative to the frame of the baler, to allow the width of the baling chamber to be increased and decreased as necessary. Hitherto, the positions of the two side walls have been adjustable independently of one another.

SUMMARY OF THE INVENTION

In accordance with the present invention, there is provided a square baler having a baling chamber of which the side walls are movable by respective hydraulic cylinders, wherein the supply of hydraulic fluid to and from the two hydraulic cylinders is effected by a common control circuit that ensures that the two sides walls are displaced in synchronism with one another by equal and opposite amounts.

Though moving only one side wall of the baling chamber at a time has the desired effect on the density of the bale, imbalanced movement of the side walls tends to deform the bale causing the sides of bales to curve, resulting for example, in a bale of banana shape when viewed from above. The resulting deformed bales suffer from the disadvantage of being more difficult to handle and to stack.

In the invention, by moving the side walls at the same time and by equal and opposite amounts (i.e. when one side wall moves to the left the other moves to the right), it is possible ensure that the longitudinal centreline of the baling chamber, remains the same at all times. The bales are therefore always advanced along the baling chamber centreline and remain straight-sided during and after their formation.

In an embodiment of the invention, each side wall is moved by a respective double acting hydraulic cylinder and the flow of hydraulic fluid to corresponding working chambers of the two hydraulic cylinders is regulated by metering valves having ganged movable fluid displacement elements. In an embodiment of the invention, the fluid displacement elements are axially movable pistons but they may alternatively be formed as vanes if the metering valves are rotary valves.

A single common spool valve may serve to control the flow of hydraulic fluid to and from the metering valves.

BRIEF DESCRIPTION OF THE DRAWINGS

The invention will now be described further, by way of example, with reference to the accompanying drawings, in which.

DETAILED DESCRIPTION OF THE DRAWINGS

The terms "front", "rear", "forward", "rearward", "left" and "right" used throughout this description are determined with respect to the normal direction of travel of the machine in operation. However they are not to be construed as limiting terms.

Figure 1:
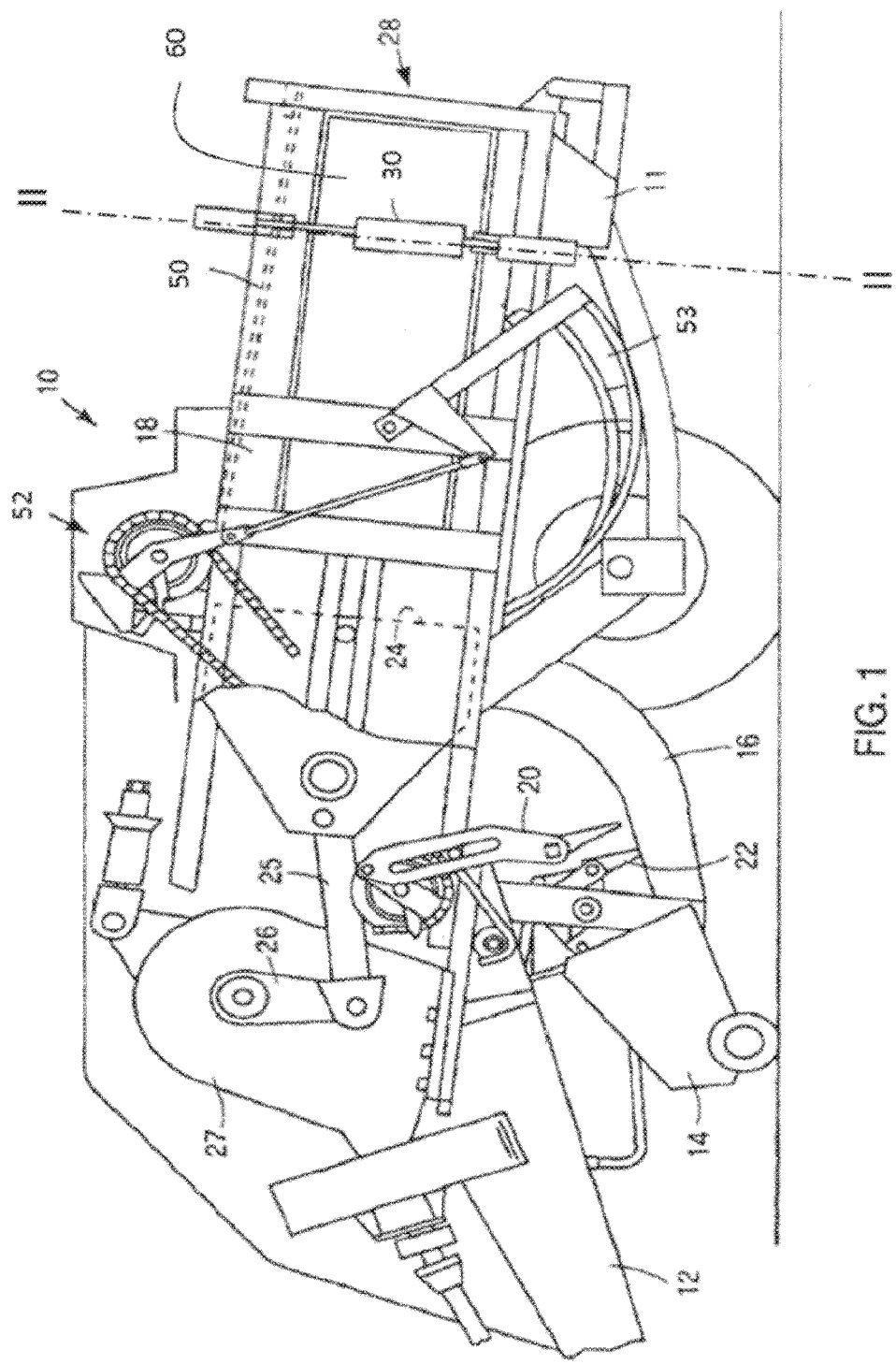
FIG. 1 is a schematic representation of a square baler.

FIG. 1 shows an agricultural baler 10 comprising a frame 11 which is equipped with a forwardly extending tongue 12 provided with hitch means (not shown) at its front end for coupling the baler 10 to a towing tractor. A pick-up assembly 14 lifts windrowed crop material off the field as the baler 10 is travelled thereover and delivers such material into the front end of a rearwardly and upwardly curved, charge-forming feeder duct 16. The duct 16 communicates at its upper end with an overhead, fore-and-aft extending baling chamber 18 into which crop charges are loaded by a cyclically operating stuffer mechanism 20. An optional continuously operating packer mechanism 22 at the lower front end of the feeder duct 16 continuously feeds and packs material into the duct 16 as to cause charges of the crop material to take on and assume the internal configuration of the duct 16 prior to periodic engagement by the stuffer 20 and insertion up into the baling chamber 18. The feeder duct 16 may be equipped with means for establishing whether a complete charge has been formed therein and operating the stuffer 20 in response thereto. Each action of the stuffer 20 introduces a "charge" or "flake" of crop material from the duct 16 into the chamber 18. Alternatively instead of a packer mechanism 22 a rotor cutter for cutting the crop material may be present.

A plunger 24 reciprocates in a fore-and-aft direction within the baling chamber 18 under action of a pair of pitman rods 25 which are linked to the crank arms 26 of a gearbox 27 rotated by a shaft which is connected to the PTO shaft of the tractor. The reciprocating plunger 24 pushes each new charge introduced into the baling chamber 18 rearwardly and forms the subsequent charges into a package of crop material, which is pushed by the plunger 24 toward a rearmost discharge aperture 28 of the chamber.

The baling chamber 18 comprises three movable wall portions, a movable top wall 50 and two movable side walls 60, 62 of which the position can be adjusted to vary the cross section of the aperture 28. Reduction of this cross section will increase the resistance to rearward movement of the crop packages and hence the density of the crop material contained therein. Similarly an increase in cross section will reduce the resistance and the density of the newly formed packages. The position of the wall portions 50, 60, 62 is controlled by corresponding actuators in the form of hydraulic cylinders 31, 30, 32 which are installed between the frame 11 and the movable walls 50, 60, 62 respectively.

Each package is securely bound in its final compacted form by a tying mechanism 52 before leaving the confines of the baler 10. The length of each bale produced by the baler 10 can be adjustably predetermined by conventional means not shown. The tying mechanism 52 comprises a series of periodically actuated needles 53 which are normally stationed in a stand-by condition below the chamber 18 but which, when actuated, swing upwardly through and across the baling chamber 18 to present twine to a corresponding series of knotters positioned on top of the chamber 18 and extending across the width of the latter. The number of needles 53 and corresponding knotters depends on the transverse width of the baling chamber. A typical large rectangular baler may include 4 to 6 needle and knotter sets for applying 4 to 6 parallel loops of binding material around the bales.

Figure 2:
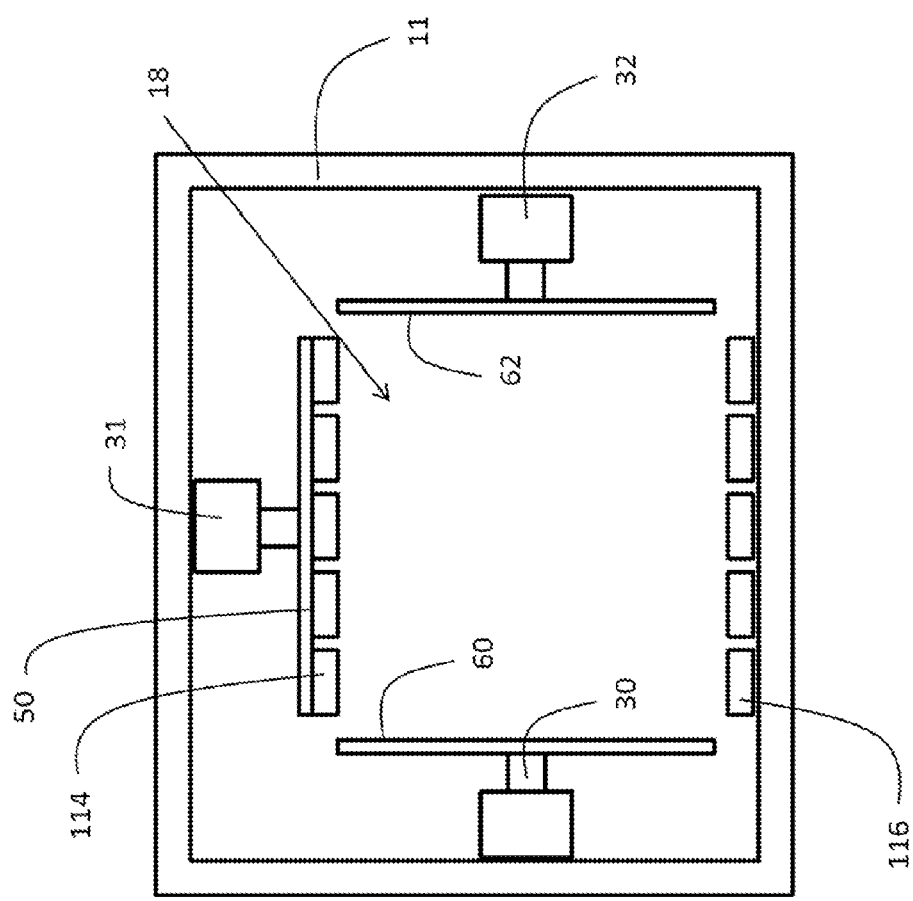
FIG. 2 is a schematic vertical section through a baling chamber along line II-II in FIG. 1.

FIG. 2 shows a schematic representation of a cross section of the baling chamber 18 at line II-II in FIG. 1. The baling chamber 18 in FIG. 1 and its surrounding components are supported on the baler frame 11. The bottom wall of the baling chamber 18 is formed by spaced girders 116 that are supported on the baler frame 11 and its top wall 50 is formed by further girders 114. The bottom wall and the top wall are formed of spaced girders because gaps are required to enable lengths of twine to be wrapped around the bales.

The sides walls 60, 62 of the baling chamber 18 are formed as reinforced plates that are arranged lengthwise along the frame 11 which serves to support these side walls 60, 62. The side walls 60, 62, can be moved in order to modify the width of the baling chamber 18 and thereby control the crop density within the formed bales. According to the invention, the two side walls 60, 62 are connected to respective actuators in the form of hydraulic cylinders 30, 32 arranged in a hydraulic circuit that ensures that the two side walls 60, 62 always move by equal amounts and in opposite directions so that the centreline of the baling chamber 18 always remains fixed. As further shown in FIG. 2 also the top wall 50 is connected to a suitable actuator 31, but according to an alternative embodiment the movement of the top wall 50 could be controlled by actuators 30, 32 in relation to the movement of the side walls 60, 62 through a suitable linkage mechanism.

Figure 3:
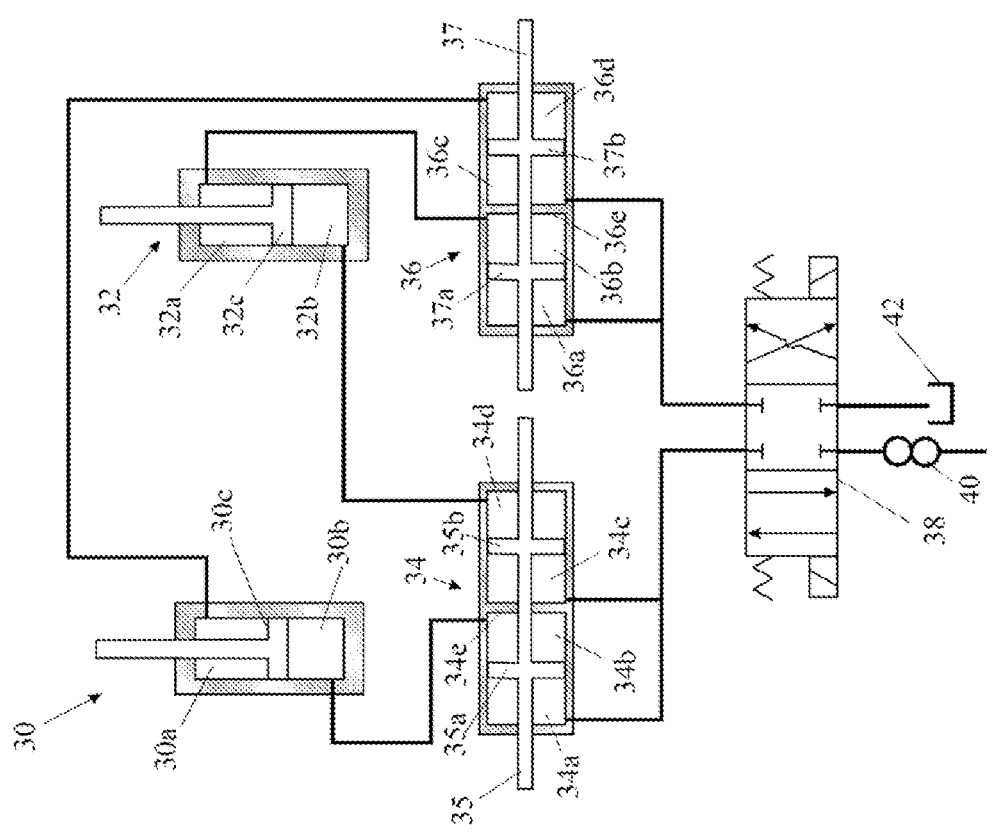
FIG. 3 is a schematic diagram showing a hydraulic circuit that includes hydraulic actuators for moving the side walls of the baling chamber in FIG. 2.

A control circuit for moving the two side walls 20 is shown in FIG. 3. The two side walls 60, 62 are connected to hydraulic actuators 30 and 32 that act between the side walls 60 and the frames 11. The hydraulic actuators 30 and 32 are formed as a double acting hydraulic cylinder and comprise a piston 30c, 32c separating two working chambers 30a, 30b and 32a, 32b respectively.

The hydraulic circuit further comprises two metering valves 34 and 36 provided to meter equal quantities of hydraulic fluid to the working chambers of the hydraulic jacks 30, 32. Each of the metering valves 34, 36 has an internal partition 34e, 36e dividing it into two equal halves. A piston rod 35, 37 in each metering valve 34, 36 is connected to two pistons 35a, 35b; 37a, 37b which divide each of the metering valves 34, 36 into four working chambers 34a to 34d and 36a to 36d.

A two-port three-position spool valve 38 controls the supply of hydraulic fluid between the metering valves 34, 36 and a pressure source 40 and a drain 42.

In the illustrated neutral position of the spool valve 38, the working chambers 34a, 34c and 36a, are all sealed and isolated from supply source 40 and the drain 42. In this position, the hydraulic jacks are locked as hydraulic fluid cannot flow into or out of their working chambers and the side walls remain stationary.

To move the side walls 60, 62 towards one another, the spool of the spool valve 38 is moved by a solenoid to the right as viewed in FIG. 3 thereby connecting the working chambers 34a and 34c of the metering valve 34 to the pressure source 40 and the working chambers 36a and 36c of the metering valve 36 to the drain 42. The pressure in the working chambers 34a and 36b acts on the pistons 35a and 35b to move them to the right, as viewed, causing fluid to be supplied under pressure from the working chamber 34b and 34d of the metering valve 34 to the working chambers 30b and 32b of the hydraulic jacks 30 and 32. The hydraulic pressure this causes the pistons 30c and 32c to move upwards, as viewed.

The fluid displaced from the working chambers 30a and 30b, of the two hydraulic actuators 30 and 32 returns to the working chambers 36b and 36d of the metering valve 36 causing the piston 37 to move to the left and the fluid in the working chamber 36a and 36 to be returned to the drain 42 by way of the spool valve 38.

To move the side walls away from one another, the spool of the spool valve 38 is moved to the left. This will now cause the working chambers 30a and 32b to be pressurised by way of the metering valve 36 in order to move the piston 30c and 32c downwards, while the metering valve 34 will allow the volume of fluid displaced from the working chambers 30b and 32b to be returned to the drain 42.

As the pistons 35a and 35b are mounted on the same piston rod 35, they move in synchronism and the quantity of hydraulic fluid supplied to or drained from the two hydraulic actuators 30 and 32 is therefore always the same, thereby ensuring that the side walls always move in unison and by equal amounts.

It is also possible to include an additional control circuit for the control of the hydraulic actuator 31 which moves the top wall 50. This additional control circuit can be independently controlled from the first control circuit such that an independent control of the top wall 50 is possible. As an alternative, it is possible that this second control circuit is co-operating with, or is controlled by the first control circuit. In this way, the movement of the top wall 50 will be similar to the movements of the side walls 60, 62.

It will be clear to the person skilled in the art that various modifications may be made to the described hydraulic circuit without departing from the scope of the invention as set out in the appended claims. For example, one of the working chambers 34a, 34c could be vented to atmosphere instead of being connected to the spool valve 38. The same applies to the working chambers 36a and 36c. Furthermore, though the metering valves have been described as having axially displaceable piston rods 35 and 37, they could be designed as rotary valve having vanes extending from a rotary shaft and separating arcade working chambers defined by a valve housing.

The invention claimed is:
1. A square baler comprising:
   a plunger;
   a baling chamber comprising side walls that are movable by respective hydraulic actuators, wherein a supply of hydraulic fluid to and from the hydraulic actuators is effected by a common control circuit that ensures that the sides walls are displaced in synchronism with one another by equal and opposite amounts; and wherein the hydraulic actuators are double acting hydraulic cylinders and wherein the flow of hydraulic fluid to corresponding working chambers of the hydraulic cylinders is regulated by metering valves to meter equal quantities of hydraulic fluid to the working chambers, each of the metering valves having two ganged movable fluid displacement elements which divide each of the metering valves into four working chambers.

2. The square baler of claim 1, wherein the fluid displacement elements are axially movable pistons.

3. The square baler of claim 1, wherein a single common spool valve serves to control the flow of hydraulic fluid to and from the metering valves.

4. The square baler of claim 1, wherein a top wall of the bale chamber is displaceable by a third corresponding hydraulic actuator whereby the supply of hydraulic fluid to and from the third hydraulic actuator is effected by a control circuit which ensures that the top wall is displaced.

5. The square baler of claim 4, wherein the control circuit for the control of the third hydraulic actuator operates independently from the common control circuit for the control of the other two hydraulic actuators.

6. The square baler of claim 4, wherein the control circuit for the control of the third hydraulic actuator operates with the common control circuit for the control of the other two hydraulic actuators, such that the two side walls and the top wall are displaced in synchronism.

7. The square baler of claim 3, wherein a linkage mechanism is located between at least one of the first and second side wall and a top wall of the bale chamber such that the displacement of the top wall is controlled by at least one of the first and second hydraulic actuator.

* * * * *